Figure 1:
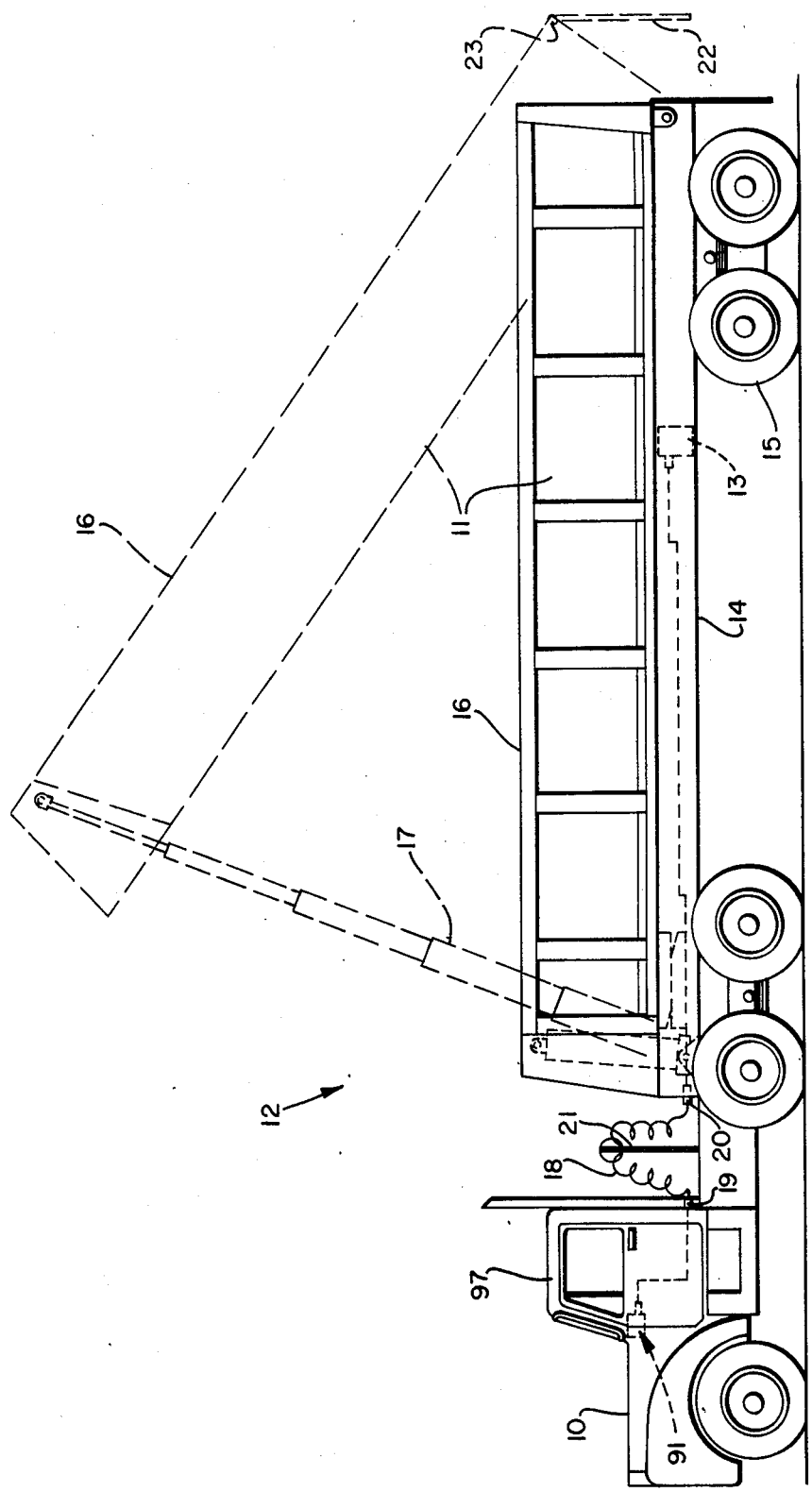

United States Patent [19]

Brawner, Jr.

[11] Patent Number: 4,682,145
[45] Date of Patent: Jul. 21, 1987

[54] TRUCK LEVEL SENSING AND INDICATING SYSTEM

[76] Inventor: Clarence A. Brawner, Jr., 7207 Fisher Rd., Dallas, Tex. 75214

[21] Appl. No.: 730,204

[22] Filed: May 3, 1985

[51] Int. Cl.[4] .............................................. B60Q 1/00
[52] U.S. Cl. ................................. 340/52 H; 180/282;
200/61.45 R; 340/689
[58] Field of Search ............................ 340/52 H, 689;
200/52 A, 61.02, 61.45 R, 61.52; 180/282, 283;
280/DIG. 1, 6 R; 298/178

[56] References Cited

U.S. PATENT DOCUMENTS

| 2,562,567 | 7/1951 | Moledzky | 340/52 H |
|---|---|---|---|
| 3,772,643 | 11/1973 | Dodd | 340/52 H |
| 3,772,646 | 11/1973 | Keith | 340/52 H X |
| 3,921,128 | 11/1975 | Snead | 340/52 H |
| 4,320,384 | 3/1982 | Carlson | 200/61.45 R X |
| 4,565,010 | 1/1986 | Herman | 340/689 X |

FOREIGN PATENT DOCUMENTS 0045206  3/1984  Japan ................................ 340/52 H Primary Examiner—Glen R. Swann, III
Assistant Examiner—Jeffery A. Hofsass
Attorney, Agent, or Firm—Warren H. Kintzinger

[57] ABSTRACT

A level sensing system with a level sensor-data transmitter and a data receiver-display for use particularly with long (18 wheel type) trailer dump trucks plagued with a problem hazard of trailer turn over as it is elevated in the dumping process. The sensor-data transmitter is placed in a desired location on the truck trailer where it is to monitor a level condition generally on the trailer frame in the area of the trailer rear wheels, and the data receiver display is located in the truck cab for observation by the operator. The level sensor includes a plumb vane mounted with two right angle pivot axis-pitch and roll with the rotation around the roll axis when the wheels are not level. Since the plumb vane tends to remain vertical, the frame around it, attached to the truck trailer, moves relative to the vane with this movement in the roll plane sensed and data, with roll beyond a predetermined limit, transmitted reflecting roll axis angular rotation. With a roll Θ angle within preselected plus and minus limits the operator gets a green light display in the cab and if the roll Θ angle is outside the preselected limits a left red light or right red light will show indicating a hazardous tractor trailer rear wheel axis slant that could result in tipping of the trailer.

8 Claims, 9 Drawing Figures

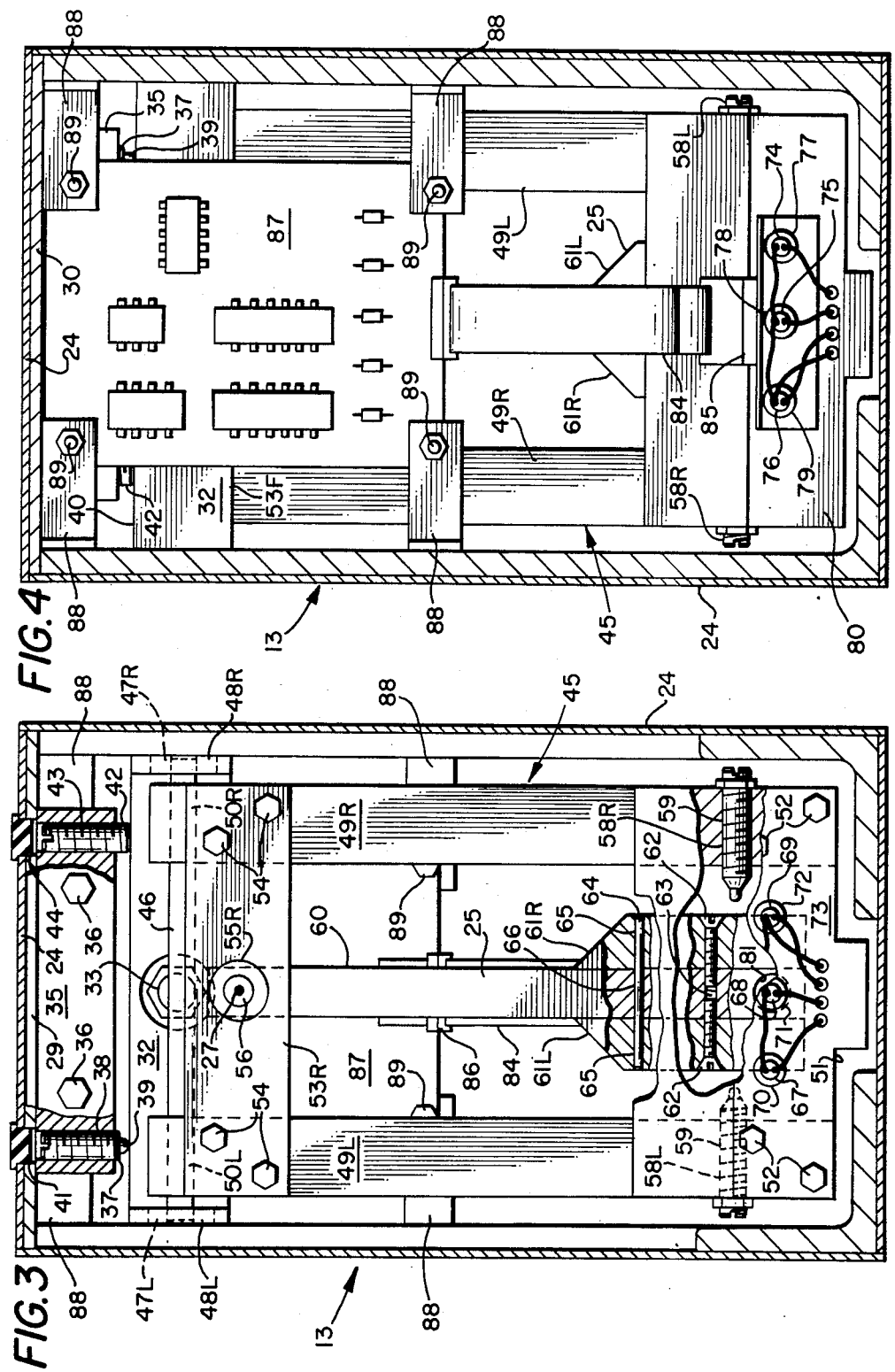

TRUCK LEVEL SENSING AND INDICATING SYSTEM

This invention relates in general to dump truck level indication and control, and more particularly, to a dump truck level sensing and indicating system especially useful for large tractor trailer dump trucks that are susceptible to trailer turn over during trailer elevation in the dumping process.

Many trailer companies that haul dirt, gravel, sand and related materials in long tractor trailer dump trucks (such as eighteen wheeler trucks with dump trailers) have a hazardous problem with the trailer turning over as it is elevated for dumping. This is brought about primarily as the result of rear trailer wheels not being level and rear tandem axle units not being transversely level. There are even some cases where unevenness in the tractor rear wheels also causes overturning of a trailer. When a trailer turns over there is usually considerable damage to the trailer itself and in some instances the tractor trailer interconnect pulls the tractor over with turnover of the trailer resulting in damage to the tractor also. Further, with these disastrous events in addition to costly equipment damage and down time, human injuries have occurred.

It is therefore a principal object of this invention to provide a level and indicating system for dump trucks as an aid to reducing or eliminating truck trailer turn over during trailer elevation in the dumping process.

Another object is to give the driver operator of a tractor trailer dump truck an in cab indication of the levelness of the rear axle of the trailer and whether a preset limit of axle or truck bed slant has been exceeded or not.

A further object is to not only prevent damage to truck trailers and tractors with turn over induced by dump raising of a trailer over non-level ground but to make use of tractor trailer trucks safer to the driver-operator, passengers and bystanders.

Still another object is to provide such a level and indicating system that is easy to install and maintain, that is reliable in performance and reasonable from a cost standpoint.

Another object of the level and indicating system is to have minimal line connection requirements in sensor to tractor interconnects and in many instances simply use otherwise unused lines and connector pin contacts of standard cable and connector systems used on tractor trailer units.

Features of the invention useful in accomplishing the above objectives includes, in a trailer dump truck with a dump trailer level sensing and indicating system, a sensor-data transmitter placed in a desired location on the truck trailer where it is to monitor the transverse level condition of the rear of the dump truck trailer in the area of the rear wheels or the trunnion of a rear tandem axle unit of the trailer. A data receiver display is located in the truck cab conveniently for observation by the driver-operator. The level sensor includes a plumb vane mounted with two right angle pivot axis-pitch and roll with rotation from the vertical around the roll axis when the truck bed in not transversely level and the wheels are not level. Since the plumb vane tends to remain vertical, the frame around it, attached to the truck trailer, moves relative to the vane with this movement in the roll plane sensed and data, with roll beyond a predetermined limit, transmitted reflecting roll axis angular rotation. With a roll Θ angle within preselected plus and minus limits the operator gets a green light display in the cab and if the roll Θ angle is outside the pre-selected limits a left red light or right red light will show indicating a hazardous tractor trailer rear wheel axis slant that could result in tipping of the trailer.

A specific embodiment representing what is presently regarded as the best mode of carrying out the invention is illustrated in the accompanying drawings.

Figure 2:
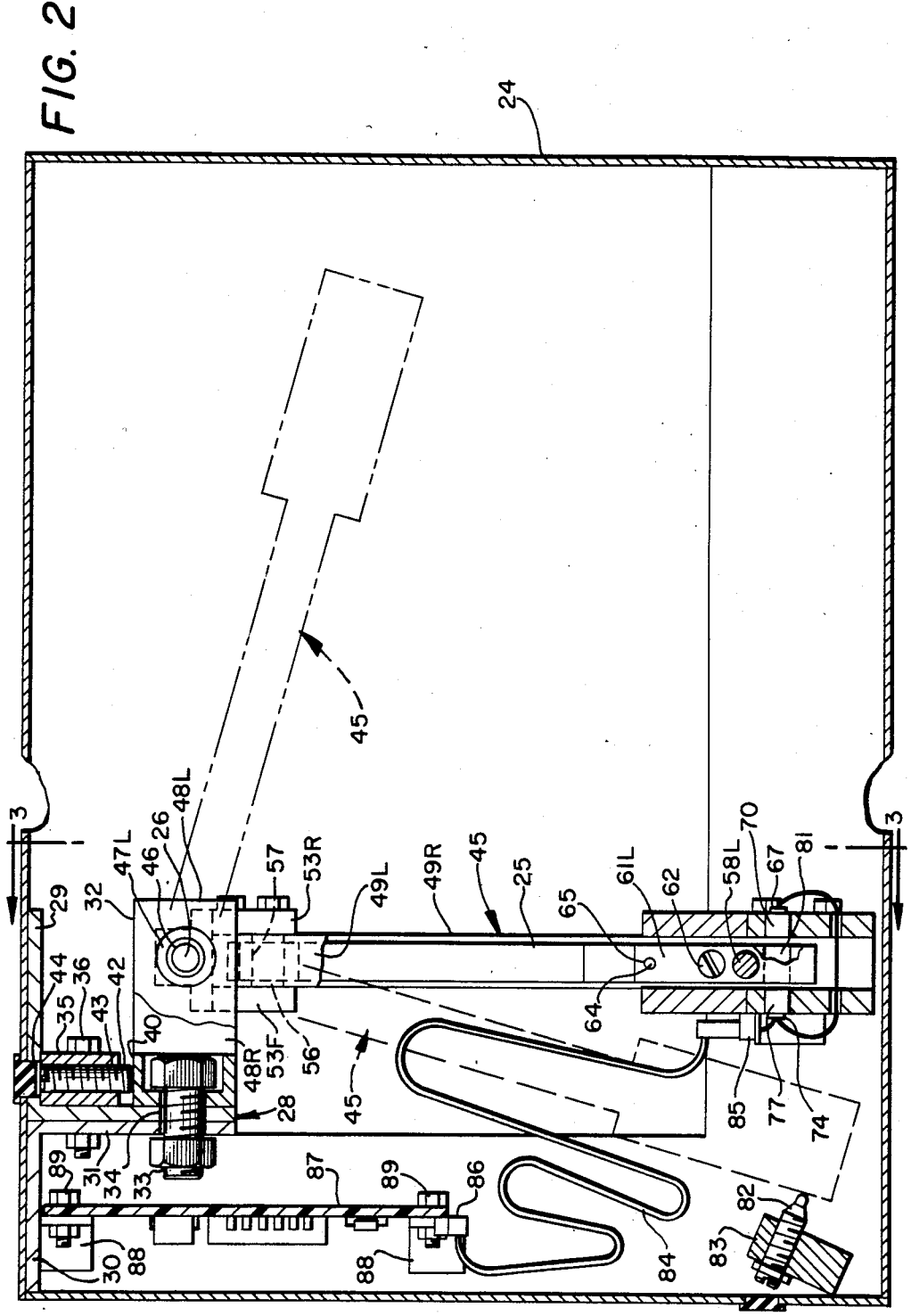
Figure 5:
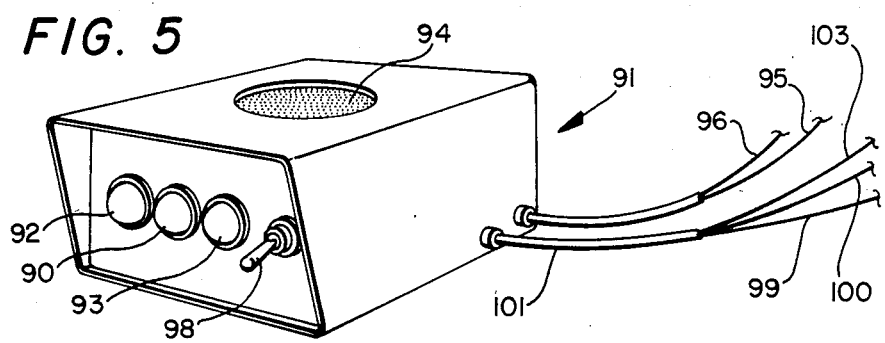
Figure 6A:
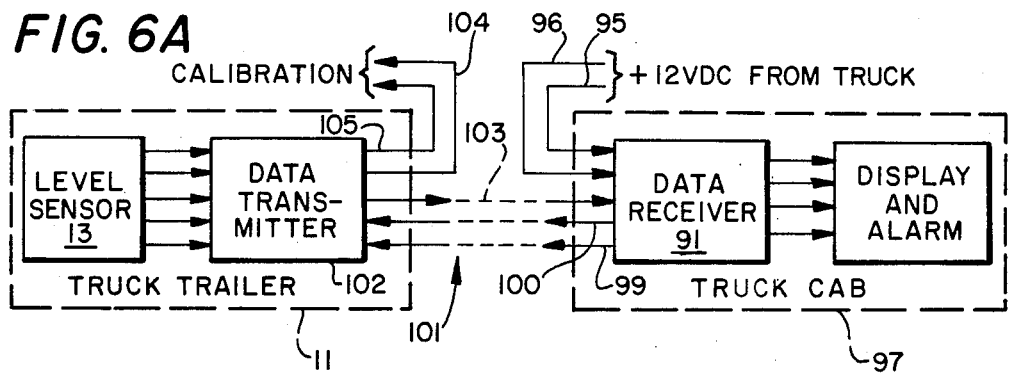
Figure 6B:
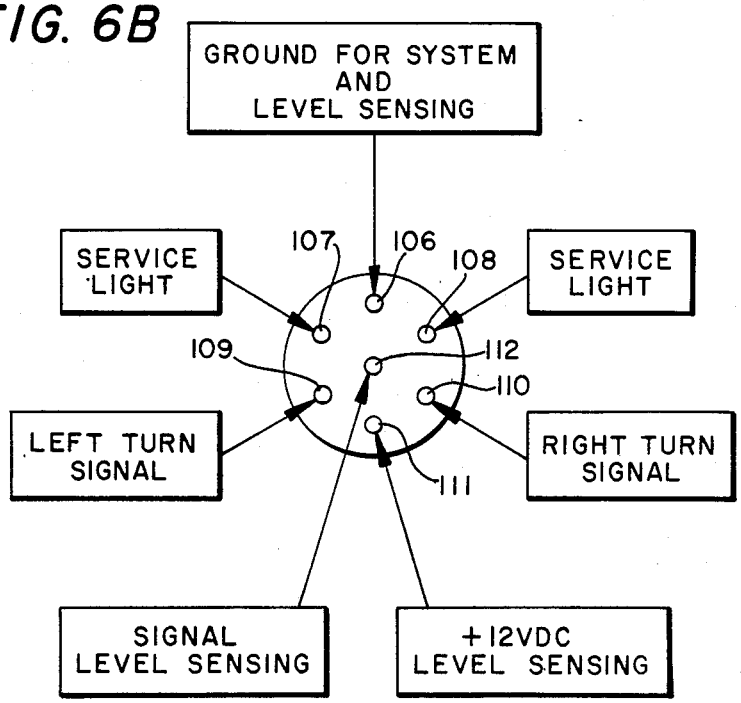
Figure 7:
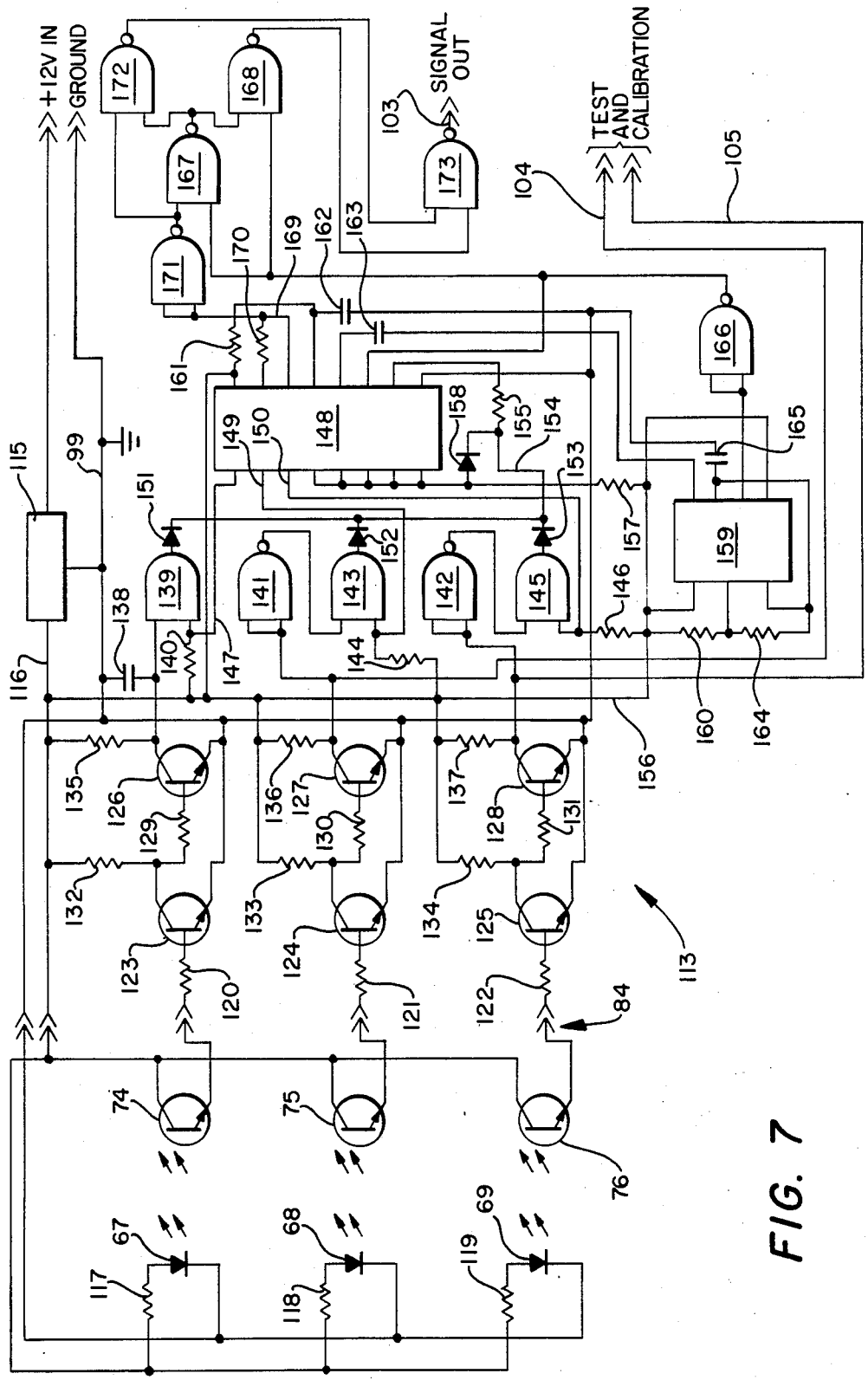
Figure 8:
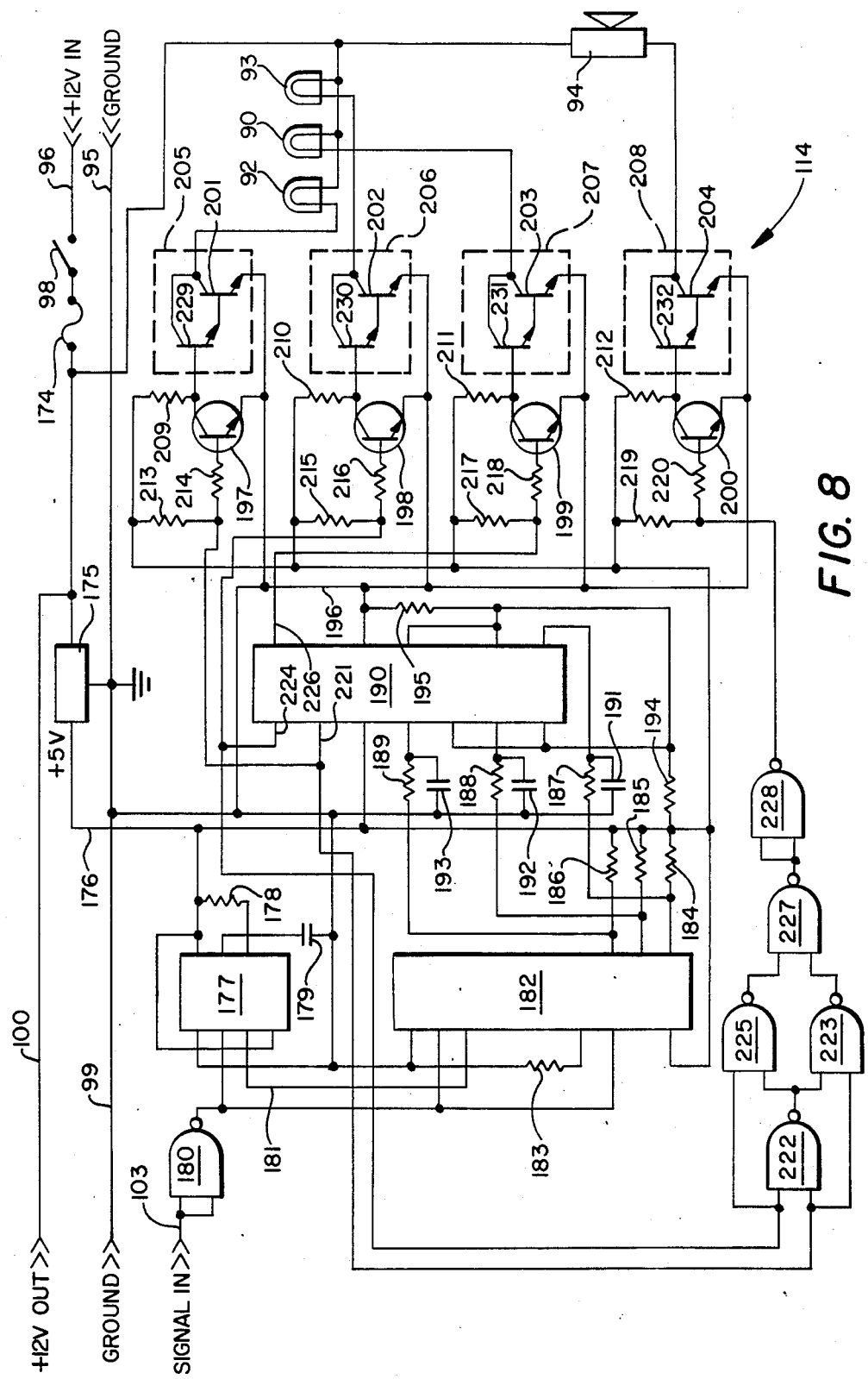

In the drawings:

FIG. 1 represents a side elevation view of a tractor trailer dump truck with the dump trailer in the lowered state and in a raised state in phantom with the trailer equipped with a level sensing unit;

FIG. 2, a cut away and sectioned side elevation view of the level sensing unit that is mountable in the trailer frame bed adjacent the rear tandem axle unit of the trailer;

FIG. 3, a partially cut away and sectioned rear elevation view of the level sensing unit of FIG. 2;

FIG. 4, a partially cut away and sectioned front elevation view of the level sensing unit of FIGS. 2 and 3;

FIG. 5, a perspective view of the receiver-display unit that is positioned in the cab for easy viewing by the truck operator;

FIG. 6A, a block schematic diagram of the truck level sensing and indicating system;

FIG. 6B, a showing of the line connections through the connectors for the tractor to trailer interconnect system;

FIG. 7, a schematic showing of the sensor and transmitter circuitry mounted as part of the truck level sensor on the truck trailer; and, FIG. 8, a schematic showing of the receiver and display circuitry contained in the receiver-display unit.

Referring to the drawings:

A tractor 10 trailer 11 dump truck 12 is shown in FIG. 1 with the dump trailer 11 in the lowered state and indicated in phantom in the raised state. A level sensing unit 13 is shown as being mounted on the bottom of the trailer frame 14 forward from but adjacent the trailer rear tandem axle suspension unit 15. It should be noted that level sensing unit 13 could be mounted on the bottom of the dump truck trailer cargo carrier 16, particularly with truck dump trailer units not having a conventional base frame 14, where a scissors action dump trailer is used with the trailer tandem axle suspension unit being drawn toward the tractor with dump raising of the trailer. In some tractor trailer units level sensing unit 13 may also be mounted at the rear of the tractor 10 to sense the level at the rear of the tractor 10. The dump trailer 11 is equipped with a telescoping hydraulic cylinder hoist 17 of conventional construction for raising and lowering the front end of the trailer cargo carrier 16 in a conventional manner for material dumping from the trailer cargo carrier 16. A tractor 10 to trailer 11 wire interconnect cable 18 is connected by front connector 19 to the circuit system of the tractor 10 and to the circuit system of the trailer 11 by rear connector 20 with the cable a coiled flexing cable supported at the middle at the top of cable support rod 21. A tail gate 22 pivotally mounted 23 at the top is unfastened at the bottom to swing open for cargo dumping as the trailer cargo carrier 16 is raised for dumping.

Referring now to the level sensing unit 13 shown in detail in FIGS. 2, 3 and 4 the unit is shown to be enclosed in a protective rectangular box 24 that is shown to be mounted in the bottom trailer frame 14 forward from but adjacent the trailer rear tandem axle suspension unit 15. The level sensing unit 13 includes a plumb vane 25 mounted in a structure with two right angle pivot axis one a freely rotatable pitch axis 26 and the other a freely rotatable roll axis 27. This is accomplished with a top mounting frame 28 of two back to back "L" shaped flanges 29 and 30 with side by side walls forming a downward extended flange 31 used in mounting the plumb vane 25 and its associated structure. A "U" shaped shaft mounting member 32 is rotatably mounted by bolt assembly 33 and sleeve 34 on flange 31. A trim adjustment block 35 is also mounted on flange 31 above shaft mounting member 32 by bolt assemblies 36. The block 35 carries a spring plunger 37 to one side thereof vertically oriented to be screwed up and down in threaded opening 38 to have the plunger end 39 thereof resiliently press against the top 40 of shaft mounting member 32 with the spring plunger 37 accessible for adjustment through opening 41 through the box top and flange from above. A trim adjustment screw 42 is threaded in threaded opening 43 to the other side of block 35 acessable through opening 44 through the box top and flange from above for trim roll level adjustment of the "U" shaped shaft mounting member 32 and the plumb vane mounting frame 45 rotatably mounted by shaft 46 for free rotation thereof about the pitch axis 26. Opposite ends of shaft 46 are mounted by bearings 47L and 47R in the end extensions 48L and 48R of "U" shaped mounting member 32.

Plumb vane 25 mounting frame 45 opposite side members 49L and 49R extend downward from shaft mounting openings 50L and 50R on shaft 46 to the interconnection mounting of "U" shaped LED/transistor mounting assembly channel 51 on the bottom ends of side members 49L and 49R by screws (or bolt assemblies) 52. Front and rear plumb vane mounting plates 53F and 53R are mounted on the upper portions of opposite side members 49L and 49R by screws 54 in order that bearings 55F and 55R therein will rotatably support roll shaft 56 that extends through opening 57 in the top of plumb vane 25 with adequate clearance below shaft 46. This provides for free rotation in roll of the plumb vane 25 between roll limits established by opposite side spring plungers 58L and 58R adjustably position threaded in threaded openings 59 of side members 49L and 49R.

The plumb vane 25 has a center vane member 60 carrying opposite side pendulum members 61L and 61R mounted thereon by screws 62 that thread on into threaded opening 63 in vane member 60 and aligned by roll pin 64 that extends through openings 65 in members 61L and 61R and through opening 66 in center vane member 60. Three light emitting diodes (LED) 67, 68 and 69 are mounted in openings 70, 71 and 72 in the back wall 73 of channel 51 and aligned therewith infrared phototransistors 74, 75 and 76 are mounted in openings 77, 78 and 79 in front wall 80 of the channel 51. The hole 81 in plumb vane 25 is positioned to be aligned with the center light emitting diode 68 and the center infrared phototransistor 75 when the level sensing unit 13 is level in roll orientation. If the truck is on an incline when dumping the plumb vane 25 will still be vertical because the plumb vane 25 mounting frame 45 freely rotates around the pitch axis but limited in downward pitch rotation by contact with spring plunger 82 mounted in frame member 83 at the bottom front of rectangular box 24. There is a much greater range of upward pitch rotation provided for plumb vane mounting frame 45 for the occasions when the level sensing unit 13 is mounted on the bottom of the dump truck trailer cargo carrier 16 particularly where a scissors action dump trailer is used with the trailer tandem axle suspension unit being drawn toward the tractor with dump raising of the trailer. A convoluted multi-wire ribbon cable 84 interconnects cable connector 85 on the mounting frame 45 to cable connector 86 on the circuit board 87 mounted by flanges 88 and bolt assemblies 89 in the sensing unit box 24. The convoluted multi-wire ribbon cable 84 is long enough and flexible enough to allow the full range of plumb vane mounting frame 45 pendulum movement in pitch.

The level sensing unit 13 along with the plumb vane mounting frame 45 rotates around the roll axis as the trailer wheels become unlevel on uneven ground. This occurs while the plumb vane 25 remains vertical even though the frame around it, attached to the truck, moves relative to the vane 25. This relative roll movement of the plumb vane mounting frame 45 is, with prescribed limits, sensed and analyzed to determine the roll axis angular rotation. Based on physical dimensions of a dump trailer truck and required dumping conditions certain roll angles are critical and considered limits. For example, on a certain dump truck the transverse distance across the dump trailer outside tires (left outside wheel to right outside wheel) is seven feet six inches (ninety inches in all). Then if for safe dumping the outside trailer wheels can be out of level by no more than three inches for safety sake from trailer and possible tractor side turn over as the trailer is elevated in the dumping process, then the critical angle $\Theta$ determined by the $\tan \Theta = 3/90$ and the angle $\Theta = 1.91$ degrees. This 1.91 degree angle is physically set into the sensor 13 and within a $\pm 1.91$ degree roll movement the operator sees a green light 90 on the data reciever display unit 91 in the cab of the truck tractor 10. If roll attitude of the sensor 13 is greater than 1.91 degrees in either direction the data receiver display unit 91, shown in FIG. 5, will show a red light on one side or the other of the green light consistent with the direction of roll slope. The left red light 92 being on is an indication that the left outside wheels of the trailer 11 are more than three inches lower that the right outside wheels of the trailer 11 while the right red light 93 being on indicates the opposite. An audible alarm 94 is also provided with the system that is activated to sound when either the left or right red light of the data receiver unit 91 comes on. A vehicle system ground line 95 and a +12 volt DC line 96 are provided to the data receiver unit 91 in the cab 97 of the tractor 10 with the line 96 passed through switch 98.

A ground line 99 that is an extension of and common to ground line 95 and a +12 volt DC line 100 extend from the data receiver unit 91 in a cable 101 also including the data transmitter 102 to data receiver 91 signal transmission line 103 (refer also to FIG. 6A). The data transmitter 102 of the level sensing unit 13 is shown to have two test and calibration lines 104 and 105 that are used in leveling of the level sensing unit 13 and roll calibration therof. Referring also to FIG. 6B the interconnect cable 18 is a seven line cable and the connectors 19 and 20 are seven connector element connectors each with a ground for system and level sensing element 106, two service light elements 107 and 108, a left turn signal element 109, a right turn element 110, a +12 volt DC element 111, and a signal level sensing element 112.

Referring also to the sensor and transmitter circuit 113 of FIG. 7 and the receiver and display circuit 114 of FIG. 8 the ground line 99 is connected to the cathodes of the three light emitting diodes 67, 68 and 69 and the +12 volt DC line 100 is connected through DC to DC converter 115 to +5 volt DC line 116 that is connected in parallel through resistors 117, 118 and 119 to the anodes of the LED's 67, 68 and 69. The collectors of infrared phototransistors 74, 75 and 76 are connected to the +5 volt DC line 116 and the emitters thereof are connected through the ribbon connector 84 and resistors 120, 121 and 122, respectively, to the bases of transistors 123, 124 and 125 on circuit board 87. The emitters of transistors 123, 124 and 125 are, along with the emitters of transistors 126, 127 and 128, connected to the ground line 99 while the collectors thereof are connected through resistors 129, 130 and 131 to the bases of transistors 126, 127 and 128 and through resistors 132, 133 and 134 to the +5 volt DC line 116. The collectors of transistors 126, 127 and 128 are connected through resistors 135, 136 and 137 to the +5 volt DC line 116 and also, respectively, through capacitor 138 to ground line 99 and as an input to AND gate 139 also having an input connection through resistor 140 from the +5 volt DC line 116, to two inputs of inverter 141 and also to test and calibration line 104, and to two inputs of inverter 142 and also to test and calibration line 105. The output of inverter 141 is connected as an input to AND gate 143 that also has an input connection through resistor 144 to the +5 volt DC line 116, and the output of inverter 142 is connected as an input to AND gate 145 that also has an input connection through resistor 146 to the +5 volt DC line 116. Line 147 interconnects programmable timer/counter 148 and the junction of resistor 140 and AND gate 139, line 149 from the counter 148 and the junction of resistor 144 and AND gate 143, and line 150 from the counter 148 and the junction of resistor 146 and AND gate 145. The outputs of AND gates 139, 143 and 145 are connected through diodes 151, 152 and 153 to line 154 that is connected through resistor 155 to programmable timer/counter 148. The +5 volt DC line 116 is connected through branch line 156 and resistor 157 to a plurality of counter 148 connections and also to and through diode 158 to line 154. The +5 volt DC branch line 156 is also connected directly to timer circuit 159 and through resistor 160 to another input of the timer circuit 159 in addition to being connected directly to counter 148 and through resistor 161 to another counter 148 connection that is also connected through capacitor 162 to ground. Another connection of counter 148 is connected through capacitor 163 to a connection of timer circuit 159. The junction of resistor 160 and a connection of timer circuit 159 is connected on through resistor 164 to two additional connections of the timer circuit 159 and also through capacitor 165 to ground. An output connection of timer circuit 159 is connect as both inputs to inverter 166 that has an output connection in common with a connection of counter 148 as inputs to exclusive -OR gates 167 and 168. An output connection of counter 148 through line 169 and a connection thereof through resistor 170 are connected on through line 169 as both inputs to exclusive -OR gate 171. The output of gate 171 is connected as an input to exclusive -OR gates 167 and 172 and the output of gate 167 is connected as an input to exclusive -OR gates 168 and 172. The outputs of gates 168 and 172 are connected as the two inputs of exclusive -OR gate 173 for developing the signal out applied through line 103 to the data receiver 91.

Referring to the receiver and display circuit 114 of FIG. 8 the +12 volts DC of line 96 is connected through switch 98 and fuse 174 to voltage regulator 175 that, with a ground connection to ground reference line 95, develops +5 volts DC on line 176. The +5 volts DC is connected to two connections of timer circuit 177 and through resistor 178 to a third connection of the timer circuit 177. Ground line 99 is connected directly and also through capacitor 179 to the timer circuit 177 that receives an input from inverter 180 that is connected to signal line 103 as its two inputs. The output line 181 from timer circuit 177 is connected as in input to programmable timer counter 182 that has two input connections from inverter 180. Counter 182 has a ground connection from line 99 and on through resistor 183 a second connection and connections from +5 volt DC line 176 through resistors 184, 185 and 186. The connections of resistors 184, 185 and 186 with timer counter 182 are connected through resistors 187, 188 and 189 as inputs to quad comparator circuit 190 with the connections thereof connected through capacitors 191, 192 and 193 to ground. The +5 volt DC line 176 is connected directly to quad comparator circuit 190 and through resistor 194 to four connections of the quad comparator circuit 190 and on through resistor 195 to the circuit 190 and to line 196. The line 196 is connected to the emitter of NPN transistors 197, 198, 199 and 200 and to the emitter of transistors 201, 202, 203, and 204 of NPN Darlington transistor circuits 205, 206, 207 and 208. The +5 volt DC line 176 is connected through resistors 209, 210, 211 and 212 to the collectors of transistors 197, 198, 199 and 200 and serially through resistors 213 and 214, 215 and 216, 217 and 218, and 219 and 220 to the respective transistor base of NPN transistors 197, 198, 199 and 200.

Output connection 221 of quad comparator circuit 190 is connected to the junction of resistors 213 and 214 and thereby to the base of NPN transistor 197 and also as an input to exclusive OR gates 222 and 223. Output connection 224 of circuit 190 is connected to the junction of resistors 215 and 216 and thereby to the base of NPN transistor 198 and also as an input to exclusive OR gates 222 and 225. Output connection 226 of circuit 190 is connected to the junction of resistors 217 and 218 and thereby to the base of NPN transistor 199. The output of exclusive OR gate 222 is connected as an input to exclusive OR gates 223 and 225 the outputs of which are connected as the two inputs of exclusive OR gate 227. The output of exclusive OR gate 227 is connected to the two inputs of inverter 228 the output of which is connected to the junction of resistors 219 and 220 and thereby to the base of NPN transistor 200. The collector outputs of NPN transistors 197, 198, 199 and 200 are connected to the base, respectively, of NPN transistors 229, 230, 231 and 232 the collectors of which are connected in common with the collectors of NPN transistors 201, 202, 203 and 204 and the emitters of which are connected to the bases of the transistors 201, 202, 203 and 204. The common collector connections in the NPN Darlington transistor circuits 205, 206, 207 and 208 are connected as the output connections to, respectively, lamps 92, 93 and 90 and piezo ceramic alarm 94.

In operation of the sensor and transmitter 113 and the receiver and display circuit 114 in the receiver-display unit 91 the position of the plumb vane 25 is sensed by infrared light emitting diodes 67, 68 and 79 and infrared phototransistors 74, 75 and 76. The combination of a sized hole 81 in the plumb vane 25 and spaced LED's on the frame channel 51 along with phototransistors aligned therewith from the other side of channel 51 yield the information as processed by the sensor and transmitter and the receiver for the display. LED infrared energy passed to respective receiving phototransistors is amplified to the extent of producing an "on - off" indication. The hole 81 in the plumb vane 25 allows IR energy from the center LED 68 to impinge on the center phototransistor 75 giving a green light indication with the vane and frame roll centered and for a limited predetermined roll deviation from center with the size of the plumb vane 25 hole 81 directly proportional to the roll angle subtended for the green indication. The LED and phototransistors on each side of center are used for centering the plumb vane 25 and calibrating the system and to control the red light indicators to show the direction the plumb vane moves (i.e. which wheel side is low) and when a predetermined allowable roll limit is exceeded. The two outside IR phototransistors are receiving IR energy when the plumb vane 25 is centered and the green signal is being generated upon installation with these signals monitored via a test set attached to the sensor box output cable. If both side indications are not obtained the frame calibration adjust is turned until both outside IR phototransistors are receiving IR energy. The IR phototransistor received energy signals require processing and transmission receiving and conversion to visual indications in the display 91. This plumb vane 25 to frame roll deviation signal data is converted into a digital pulse train that is sent over the single wire 103 to the receiver and display circuit 114. This transmission of data over a single wire is advantageous since there are not any other spare wires in truck tractor to trailer standard equipment cables.

In the sensor and transmitter circuit 113 NPN transistors 123-128 amplify and change the signals from phototransistors 74, 75 and 76 into on-off voltages. When the phototransistors 74, 75 and 76 receive IR energy from the LED's 117, 118 and 119 voltage will be present on the output transistors 126, 127 and 128 with in digital terms the positive voltage up to +5 volts being considered a "1". The transistor 127 and 128 outputs have branch connections to test pins in an output cable for use in system calibration. Transistor 127 and 128 outputs also go to inverters 141 and 142 that change the signal to a "1" when respective LED/phototransistor IR signal paths are obstructed by the plumb vane 25. Only one of the two outside IR signal paths will be broken at any one time the plumb vane 25 is in a roll state giving either a left or right indication. The output of transistor 126 goes to AND gate 139 and the inverted outputs of transistors 127 and 128 go to AND gates 143 and 145 respectively. The programmable timer/counter 148 contains a time base oscillator (TBO), control flip-flop, and a binary counter with eight binary outputs in the form of voltage square waves whose frequency depends upon the TBO and the binary number. The first three outputs are used to scan the AND gates 139, 143 and 145 wherein if there is a "1" on the input and a "1" is received from the binary counter a "1" will appear at the gate output. Any other condition on the AND gate inputes of each AND gate will result in a zero at the gate output. When both "1"s appear on an AND gate 139, 143 or 145, a "1" is sent to the reset pin on the programmable timer/counter 148. This RESET signal stops the TBO and resets the binary counter. Scanning the AND gates is in sequence starting with the pin on the timer/counter 148 as an input to AND gate 139 on through the next two pins attached to AND gates 143 and 145. The first of these three gates that generates the RESET signal stops the count and the signals in the remaining gates are disregarded. With this operation the green indicator signal from NPN transistor 126 is connected to AND gate 139 that is also connected to the first pin on timer/counter 148. As long as the green indicator signal is on the red indicators will not turn on. For example, if the plumb vane 25 moves slightly to the left, the green indicator signal will be on and the left LED IR phototransistor signal will be off or 0. The 0 is inverted to a 1 and applied to AND gate 143. But AND gate 139 will have a 1 received from the center LED IR transistor and will stop the scan before it reaches AND gate 143 to produce a green indication. When the plumb vane 25 moves further to the left and blocks off the center LED/IR phototransistor path AND gate 139 receives a 0 from NTN transistor 126. At this time AND gate 143 has a 1 from the inverted signal and now AND gate 143 generates the RESET to stop the TBO and, as a result, the green indicator is off and the left red indicator is on.

A RESET signal stops the TBO and resets the binary counter and then, to repeat the cycle the programmable timer/counter 148 must receive a trigger pulse that enables the TBO and the cycle is repeated. During an ongoing cycle the TBO produces output pulses at a high frequency rate 10 KHz to 50 KHz and the number of pulses depends on the counter binary number. In this case the first pin reset will give a TBO output of one pulse, the second pin reset results in tow TBO pulses and pin 3 reset gives four TBO pulses. The trigger pulse is supplied by the time clock oscillator 159 that oscillates at thirty to fifty Hz producing trigger pulses. Since these pulses are negative going they are inverted by inverter 166, with the time clock oscillator the rate of data transmission and thereby the display update rate. The TBO pulses from timer/counter 148 are negative going and are inverted by inverter 171. The TBO and trigger pulses are combined into a pulse train, through exclusive -OR gates 167, 168, 172 and 173, that is sent to the display over the single wire 103.

The display circuit 114 receives the digital data from the sensor and transmitter 113 and converts it into a visual display. The pulse train consisting of a trigger synchronizing pulse and the transmitter TBO pulses enter the receiver and display circuit 114 with the pulse group being inverted through inverter 180 before reaching timing circuit 177 and programmable timer/counter 182. The first pulse (a trigger pulse) in each pulse group triggers the timing circuit 177 that is a one-shot timing circuit and the same pulse resets the programmable timer/counter 182. The output pulse from the timing circuit 177 triggers the programmable timer/counter 182 and allows it to accept the TBO pulses in the input signal with in this mode of operation the timer/counter 182 passive with its counter driven by the incoming TBO pulses. When the TBO in the transmitter puts out four pulses the binary counter in timer/counter 182 counts and holds four pulses. The outputs of timer/counter 182 go to the quad voltage comparator 190. The output from either of three pins of timer/counter 182 when present will exceed the voltage threshold set by the resistance divider of resistors 194 and 195 resulting in the respective quad voltage comparator 190 output to change to 0 with the other comparator 190 outputs remaining at "1". NPN transistors 197, 198 and 199 individually invert the 0 turning on a respective one of the Darlington transistor circuits 205, 206 and 207 to provide a completed ground turning on a specific, respective, indicator light 90, 92 and 93. For example, if the incoming TBO signal consists of four pulses, the third pin on the timer/counter 182 is a "1". The fourth pin on the quad voltage comparator 190 is "1" that is above the resistor divider threshold. The pin connection to line 221 out of the comparator 190 is the resultant output to the input to the fourth pin through resistor 189 with line 221 going to 0. NPN transistor 197 inverts the 0 to a "1" turning the Darlington transistor circuit 205 on with the output therefrom going to ground causing the red light 92 to come on. The circuits hold this condition until the next set of data that calls for a different indication is received from the level sensor and transmitter circuit 113. The exclusive-OR gate 222 samples each red channel and if either is activated and a red light is on the Darlington transistor circuit 208 is activated to the on state establishing a ground path for the Piezo-Ceramic alarm 94 giving the dump trailer truck operator an audible signal further alerting him to an unsafe unlevel condition.

Whereas this invention has been described particularly with respect to a single embodiment thereof, it should be realized that various changes may be made without departure from the essential contributions to the art made by the teachings hereof.

I claim:

1. A level sensing system for trailer dump trucks with a sensor-data transmitter positioned in a truck where it is to monitor the transverse level condition of the truck generally on the trailer frame in the area of the trailer rear wheels comprising: a sensor-data transmitter mountable on a truck; a data receiver and display unit usually positioned in the cab of a truck; a plumb vane included in said sensor-data transmitter; pitch axis mount means for said plumb vane; roll axis mount means for said plumb vane; a frame mounting said plumb vane and said roll axis mount means; dual cross members at the lower portion of said frame one in front of said plumb vane and one behind said plumb vane; said frame mounting a plurality of light emanating devices on one of said dual cross members of said frame; said frame also mounting a plurality of light sensitive activation devices subject to activation and deactivation by the amount of light impinging thereon; said pluarality of light emanating devices and said plurality of light sensitive activation devices positioned such that light paths between matched pairs of said devices are subject to intrusion interruption by said plumb vane when said sensor-data transmitter experiences predetermined amounts of roll from the transverse level state consistent with the transverse level condition of the trailer truck wheel set the said sensor-data transmitter is mounted near; signal transmission means interconnecting said sensor-data transmitter and said data receiver and display unit; and indicator means with said data receiver and display unit activated to indicate a roll state of the wheel set and the sensor-data transmitter when predetermined left or right roll angles are exceeded; wherein said plurality of light emanating devices are light emitting diodes; said plurality of light sensitive activation devices are phototransistors; said sensor-data transmitter is a digital data transmitter; said data receiver is a digital signal processing data receiver; said signal transmission means is a system with a common potential reference line, a DC voltage level line, and digital signal line means; there is a left hand set and a right hand set of light emitting diode and phototransistor combinations positioned to the right and left relative to said plumb vane and so sensitivity set as to trigger off with roll to a respective left or right side beyond a predetermined set degree of roll; and wherein said data receiver and display unit includes at least two lights as indicator means indicating a roll state of the wheel set and the sensor-data transmitter by one of the lights coming on when predetermined left or right roll angles are exceeded.

2. The level sensing system for trailer dump trucks of claim 1, wherein said data receiver and display unit includes three lights left and right red lights and a center green light with the digital data system of said sensor-data transmitter and said digital data receiver and display unit activating the green light with the system energized and roll to left or right not exceeding a predetermined limit that when exceeded the left or right red light coming on dependent on the direction of roll and the green light simultaneously turns off.

3. The level sensing system for trailer dump trucks of claim 2, wherein a light emitting diode and phototransistor set provide signalling for activation of said green light through a range of roll movement between predetermined left and right roll angles; and opening means in said plumb vane sized to pass light from said light emitting diode to said phototransistor through the range of roll movement between predetermined left and right roll angles.

4. The level sensing system for trailer dump trucks of claim 1, wherein said pitch axis mount means for said plumb vane includes top pivot means mounting of said frame mounting said plumb vane and said roll axis mount means permitting said frame to depend generally vertically when solely under the influence of gravity from said pitch axis.

5. The level sensing system for trailer dump trucks of claim 4, wherein said pitch axis mount means includes a pivot rod mounted in a pivot rod mounting member mounted in the truck to hold said pivot rod transversely parallel to the axle structure of the set of opposite side wheels the sensor-data transmitter is mounted close to.

6. The level sensing system for trailer dump trucks of claim 5, wherein said pivot rod mounting member is pivotally mounted for level adjustment of said pivot rod mounting member and the frame in roll; and roll position adjustment means held in housing mount means for adjusting roll trim of said frame.

7. The level sensing system for trailer dump trucks of claim 6, wherein said sensor-data transmitter is enclosed within a protective housing, mountable to truck frame members with digital data transmitter circuitry mounted on circuit board means in said protective housing; and with circuitry of said light emitting devices and said light sensitive activation devices on said frame also within said protective housing.

8. The level sensing system for trailer dump trucks of claim 7, wherein convoluted multi-wire cable means interconnecting said digital data transmitter circuitry mounted on said circuit board means and circuitry of said light emitting devices and said light sensitive activation devices on said frame is freely flexible and long enough to allow the full range of plumb vane mounting frame pendulum movement in pitch.

\* \* \* \* \*